(No Model.)

J. WILLIAMS.
INSECT TRAP.

No. 383,788.  Patented May 29, 1888.

Witnesses.
G. W. Clark.
D. Ross.

Inventor.
John Williams,
By Geo. Ross.
Attorney.

UNITED STATES PATENT OFFICE.

JOHN WILLIAMS, OF PORT COLBORNE, ONTARIO, CANADA.

INSECT-TRAP.

SPECIFICATION forming part of Letters Patent No. 383,788, dated May 29, 1888.

Application filed December 7, 1887. Serial No. 257,244. (No model.)

*To all whom it may concern:*

Be it known that I, JOHN WILLIAMS, of the village of Port Colborne, in the county of Welland and Province of Ontario, Canada, have invented a new and useful Insect-Trap, of which the following is a specification.

My invention relates to the trapping of insects during darkness in a vessel with sloping sides and narrow at the top containing a liquid above which a light is suspended. This trap can be hung from the boughs of an apple-tree in the night, and will be particularly useful for trapping the codling-moth; or exposed in any situation it will be useful for catching any kind of moth or insect which flies during night. It will be of value both for destroying and collecting insects.

My insect-trap is illustrated in the accompanying drawings, in which—

Figure 1:
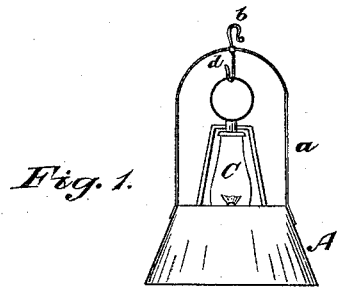
Figure 2:
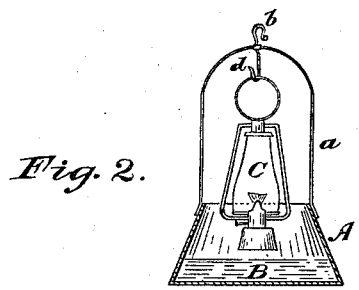

Figure 1 is a side view. Fig. 2 is a vertical section, and Fig. 3 a top plan view.

Similar letters refer to similar parts throughout the several views.

Figure 3:
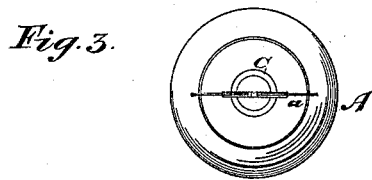

The vessel A has sloping sides contracting toward the top, and preferably of circular shape, as shown in Fig. 3. It can be suspended in any required position by the hook $b$, attached to the handle $a$. The vessel A may be made of galvanized iron or any other suitable material, and when in use will contain one or two inches of water, B, either pure or containing soapsuds or any solution that may be useful for killing or preserving the insects captured. The lighted lantern C is suspended in the vessel A by the hook $d$ in such manner that the light $c$ is on a level with or slightly above or below the top of the vessel A. Insects are attracted to the light, and flying about in the vessel strike against the sloping sides and are thrown into the liquid and thus captured.

I do not claim as my invention the combination of a lighted lantern suspended above a vessel containing a liquid for the trapping of insects; but What I do claim as my invention, and desire to secure by Letters Patent, is—

In insect-traps, the combination of an open vessel, A, contracted at the top and containing a liquid, B, and with the handle $a$ and hook $d$, from which an ordinary lantern can be suspended so that the light is on or near a level with the top of the vessel A, substantially as set forth.

JOHN WILLIAMS.

Witnesses:
GEO. ROSS,
W. GIBSON.